May 17, 1927.
F. C. MILLER
1,629,354
CYLINDER DRAINAGE AND RELIEF VALVE
Filed Feb. 17, 1922
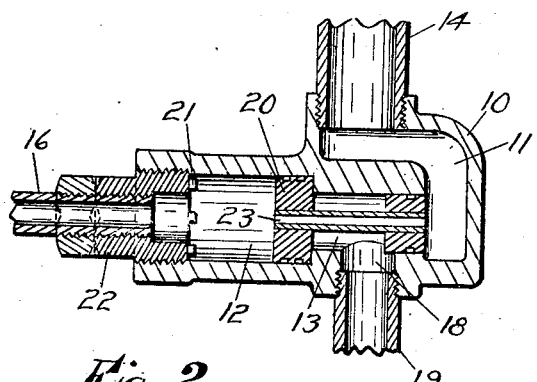
Fig. 2.
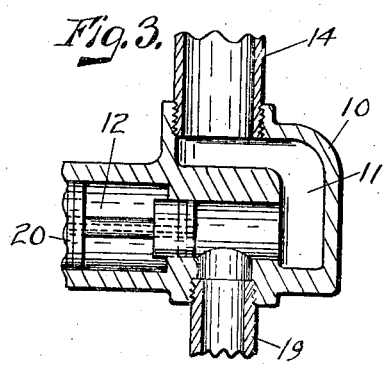
Fig. 3.
Fig. 4.
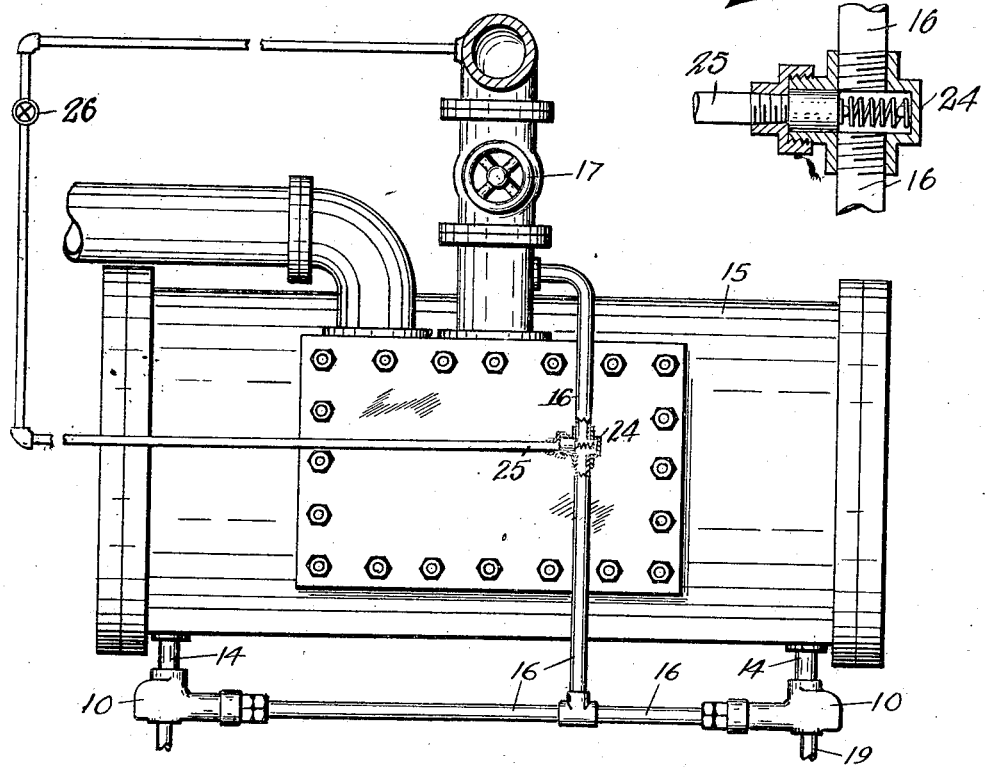
Fig. 1.
Inventor
Frank C. Miller
By Attorneys
Southgate & Southgate Patented May 17, 1927.

1,629,354

UNITED STATES PATENT OFFICE.

FRANK C. MILLER, OF AUBURNDALE, MASSACHUSETTS.

CYLINDER DRAINAGE AND RELIEF VALVE.

Application filed February 17, 1922. Serial No. 537,288.

This invention relates to a drainage and relief valve for steam engine cylinders, the device being particularly useful when applied to the cylinders of locomotives.

It is the object of my invention to provide an improved construction of valve for such purposes which will be simple and economical in construction and reliable in operation and which will fully protect the cylinder under all conditions of operation.

With this general object in view, my invention in its preferred form comprises a valve casing suitably connected to the cylinder clearance space and also to a supply of live steam from a point between the cylinder and the engine throttle. A differential piston is freely slidable in the chamber within the casing and controls a drainage or outlet opening therein.

In the preferred form, a restricted passage is provided which connects the portions of the valve chamber on the opposite sides of the differential piston. As shown in the drawings, this restricted passage is formed through the piston itself, but the location of this passage may be considerably varied. This restricted passage permits cushioning of the action of the piston and also provides drainage for the steam inlet connection.

Further features of my invention are indicated in the drawings and will be more particularly pointed out in the appended claims.

A preferred form of my invention is shown in the drawings in which

Fig. 1 is a side elevation of an engine cylinder with my improved valve applied thereto;

Fig. 2 is a longitudinal sectional elevation of the valve;

Fig. 3 is a similar view with the parts in a different position; and

Fig. 4 is an enlarged sectional view of the shut-off valve mechanism.

Referring to the drawings, my improved valve comprises a casing 10 having a chamber therein separated into end portions 11 and 12 and a connecting passage 13. A pipe 14 leads from the space 11 to the clearance space of the engine cylinder 15 and a pipe 16 leads from the space 12 to a point in the live steam supply between the throttle valve 17 and the cylinder 15. The passage 13 is provided with an opening 18 to which may be connected a drainage or drip pipe 19. A separate valve is used for each end of the cylinder but these valves may have a common connection with the steam supply, as shown in Fig. 1.

A differential piston 20 is slidable in the casing 10, the smaller portion of the differential piston fitting the passage 13 and the larger portion fitting the chamber portion 12.

Lugs 21 on the inner end of a plug 22 prevent the differential piston 20 from seating firmly against the end of the chamber 12, so that the steam entering through the pipe 16 may have access to the whole adjacent face of the piston.

In the preferred form of my invention, a restricted opening is provided between the chamber portions 11 and 12, this opening being shown in the drawings as a small passage 23 extending axially through the differential piston 20.

This opening 23 is quite restricted being preferably only 1/64 of an inch in diameter when the diameter of the engine cylinder is from 20 to 28 inches. With a 20 inch cylinder the ratio of the area of the passage 23 to the engine cylinder is something like 1 to 1,600,000.

A shut-off valve 24 may be placed in the upward connection 16 for a purpose to be described. This valve is normally held open by a spring but has a pipe 25 and valve 26 (Fig. 1) by which it is connected to a source of air or steam pressure for closing the valve when desired.

Having thus described the construction of my improved drainage and relief valve, the operation thereof will now be described.

When the throttle valve 17 is opened to start the engine, high pressure steam will enter through the pipe 16 and will act against the larger end of the differential piston to move the piston to the position shown in Fig. 2, closing the drainage opening 18. The differential piston will remain in this position during the normal operation of the engine. As soon as the throttle is closed, however, the pressure in the pipe 16 will fall and the compression in the engine cylinder, as the engine is drifting and before it comes to rest, will act upon the small end of the differential piston to move the piston to the position shown in Fig. 3.

The differential piston will retain this open position until steam is again admitted to the pipe 16. Any slight inequalities in the pressure on the opposite sides of the differential piston will be equalized through the restricted passage 23 which also serves to connect the pipe 16 to the drainage outlet 18, thus taking care of any condensation in the pipe 16 and preventing freezing thereof when the engine is dead. The steam or other fluid under pressure remaining in the pipe 16 when the valve 17 is closed gradually escapes through the restricted passage 23. This slowly escaping fluid prevents too abrupt movement of the piston 20 to the open position shown in Fig. 3, the effect of the structure including the restricted passage being similar to that of a dash pot or pneumatic cushion. At the same time, the opening 18 is freely connected by the pipe 14 to the cylinder clearance and provides effective drainage therefor.

Furthermore, the opening 18 acts as a vent for the cylinder while running idle, preventing the formation of a vacuum therein. This is of considerable importance, as it prevents the usual back draft through the exhaust connection to the smoke pipe. This back draft is objectionable for several reasons and particularly on account of the clogging of the valves and other parts of the engine by soot brought in through the exhaust.

It sometimes happens that a considerable amount of water will accumulate in the steam connections if the engine is left standing, and this water may cause serious damage when the engine is started. If water should accumulate in the connections to a cylinder having my improved valves in such quantity as to fill the clearance space, the pressure of the engine piston upon the water would act against the differential piston 20, overcoming the pressure of the steam on the large end of the differential piston 20 and permitting the escape of the water through the drainage opening 18. Ordinarily, however, my drainage and relief valve itself prevents any injurious accumulation of water.

If for any reason it is desirable to prevent closing of the drainage and relief valves when the throttle valve 17 is opened to start the engine, or in the event of excessive leakage past the closed valve 17, pressure may be admitted to the pipe 25, through the hand valve 26 and the piston in the valve 24 will be moved to close the pipe 16. This prevents the building up of pressure behind the pistons 20 in the chambers 12 and causes any excess of pressure in the pipes 14 to move the pistons to the open position shown in Fig. 3 and to retain the pistons in such position. It will be understood that the pressure in the exhaust passages and clearance spaces of the engine is always above atmospheric pressure when the engine is in operation and the piston is moving toward a given exhaust passage or clearance space. This increased pressure, however, is intermittent and cannot build up a high pressure in the chamber 12 on account of its intermittent action and also on account of the small diameter of the restricted passage 23 and the relatively large diameter of the open exhaust passage 18.

Having thus described my invention and the uses and advantages thereof, I do not wish to be otherwise limited than as set forth in the claims, but what I claim is:—

1. A drainage and relief valve comprising a valve casing having a chamber, a connection therefrom to the engine cylinder, a second connection therefrom to a supply of fluid under pressure, said chamber having a drainage outlet between said connections, and a differential piston freely slidable in said chamber between said connections and controlling said outlet, said differential piston having its smaller surface adjacent the cylinder connection, and said drainage and relief valve being provided with a much restricted passage permitting slow escape of fluid from said valve chamber and thereby providing a gradually decreasing fluid cushion for said differential piston.

2. A drainage and relief valve comprising a valve casing having a chamber, a connection therefrom to the engine cylinder, a second connection therefrom to a supply of fluid under pressure, said chamber having a drainage outlet between said connections, and a differential piston freely slidable in said chamber between said connections and controlling said outlet, said differential piston having a smaller surface adjacent the cylinder connection, and said drainage and relief valve having a restricted passage connecting the parts of the valve chamber on the opposite sides of the differential piston.

3. A drainage and relief valve comprising a valve casing having a chamber, a connection therefrom to the engine cylinder, a second connection therefrom to a supply of fluid under pressure, said chamber having a drainage outlet between said connections, and a differential piston freely slidable in said chamber between said connections and controlling said outlet, said differential piston having a restricted opening extending therethrough and connecting the parts of the valve chamber on opposite sides of said differential piston.

In testimony whereof I have hereunto affixed my signature.

FRANK C. MILLER.